(12) United States Patent
Thomas et al.

(10) Patent No.: US 10,227,934 B2
(45) Date of Patent: Mar. 12, 2019

(54) DUAL-FUEL ENGINE COMBUSTION MODE TRANSITION CONTROLS

(71) Applicant: Cummins Inc., Columbus, IN (US)

(72) Inventors: Robert J. Thomas, Indianapolis, IN (US); Axel Otto Zur Loye, Columbus, IN (US); Timothy P. Lutz, Columbus, IN (US); Christopher Pollitt, Mobile, AL (US); Phanindra V. Garimella, Bloomington, IN (US)

(73) Assignee: Cummins Inc., Columbus, IN (US)

( * ) Notice: Subject to any disclaimer, the term of this patent is extended or adjusted under 35 U.S.C. 154(b) by 73 days.

(21) Appl. No.: 15/278,330

(22) Filed: Sep. 28, 2016

(65) Prior Publication Data

US 2017/0089273 A1    Mar. 30, 2017

Related U.S. Application Data (60) Provisional application No. 62/234,216, filed on Sep. 29, 2015.

(51) Int. Cl.
*F02D 19/08* (2006.01)
*F02D 19/06* (2006.01)
(Continued)

(52) U.S. Cl.
CPC ........ *F02D 19/081* (2013.01); *F02D 19/0642* (2013.01); *F02D 35/027* (2013.01);
(Continued)

(58) Field of Classification Search
CPC ........ F02D 19/08; F02D 19/081; F02D 19/10; F02D 19/105; F02D 41/2416; F02D 41/2422
See application file for complete search history.

(56) References Cited

U.S. PATENT DOCUMENTS

| 6,101,986 A | 8/2000 | Brown et al. |
|---|---|---|
| 6,561,157 B2 | 5/2003 | zur Loye et al. |

(Continued)

FOREIGN PATENT DOCUMENTS

| EP | 2431595 | 3/2012 |
|---|---|---|
| EP | 2642104 | 9/2013 |

*Primary Examiner* — Hung Q Nguyen
*Assistant Examiner* — Kevin R Steckbauer
(74) *Attorney, Agent, or Firm* — Taft Stettinius & Hollister LLP (57) ABSTRACT

Apparatuses, methods and systems for controlling operation of dual fuel engines are disclosed. One embodiment is a method for controlling operation of a dual fuel engine based upon a combustion index value. The combustion index may be empirically determined to provide desired engine operation at a plurality of ratios of gaseous fuel and liquid fuel. The desired engine operation may include a number of criteria including, for examiner an engine knock criterion and/or an exhaust emissions criterion. The combustion index value may be determined during operation of the engine based upon measured, estimated or predicted engine operating parameters. The combustion index value may be utilized to interpolate between a first engine operating map for a first ratio of gaseous fuel and liquid fuel and a second engine operating map for a second ratio of gaseous fuel and liquid fuel.

25 Claims, 7 Drawing Sheets

(51) Int. Cl.
  *F02D 41/24* (2006.01)
  *F02D 35/02* (2006.01)
  *F02D 41/00* (2006.01)
  *F02D 41/40* (2006.01)
  *F02D 41/14* (2006.01)

(52) U.S. Cl.
  CPC ..... *F02D 41/0025* (2013.01); *F02D 41/0027* (2013.01); *F02D 41/2416* (2013.01); *F02D 41/2422* (2013.01); *F02D 41/401* (2013.01); *F02D 41/402* (2013.01); *F02D 2041/1433* (2013.01); *F02D 2200/1004* (2013.01); *F02D 2250/31* (2013.01); *Y02T 10/36* (2013.01)

(56) References Cited

U.S. PATENT DOCUMENTS

| | | |
|---|---|---|
| 6,907,870 B2 | 6/2005 | zur Loye et al. |
| 6,912,992 B2 | 7/2005 | Ancimer et al. |
| 7,270,089 B2 | 9/2007 | Wong |
| 7,277,790 B1 | 10/2007 | Green, Jr. et al. |
| 7,367,290 B2 | 5/2008 | Chen et al. |
| 8,095,294 B1* | 1/2012 | Griffiths ................ F02D 35/024 123/525 |
| 8,516,991 B2 | 8/2013 | Tanno et al. |
| 9,097,224 B2* | 8/2015 | Moscherosch ........ F02D 19/061 |
| 2012/0253641 A1* | 10/2012 | Warner ............... F02D 19/0605 701/104 |
| 2013/0054116 A1 | 2/2013 | Lepley |
| 2013/0179050 A1* | 7/2013 | Munshi ................. F02B 43/10 701/104 |
| 2014/0352656 A1* | 12/2014 | Kolhouse ............. F02B 31/085 123/308 |
| 2015/0337781 A1* | 11/2015 | Hartwick ............... F02M 51/06 123/472 |
| 2016/0115882 A1* | 4/2016 | Imhof .................. F02D 19/061 123/525 |
| 2016/0169133 A1* | 6/2016 | Yeager ............... F02D 41/0027 123/435 |
| 2017/0122226 A1* | 5/2017 | Lutz .................. B01D 53/9495 |
| 2017/0204792 A1* | 7/2017 | Thomas ............... F02D 19/0615 |
| 2017/0234245 A1* | 8/2017 | Bruner ................. F02D 41/221 123/525 |

\* cited by examiner

DUAL-FUEL ENGINE COMBUSTION MODE TRANSITION CONTROLS

BACKGROUND

The present application relates generally to controls for dual-fuel engines and more particularly, but not exclusively to dual-fuel engine combustion mode transition controls. Dual-fuel engines hold the promise of a number of potential economic and environmental benefits through the combustion of different ratios or proportions of two or more types of fuels during different modes of operation. A number of proposals have been made for controlling dual-fuel engines in multiple operating modes including controlling transitions between operating modes. Certain proposals seek to maintain total fuel energy constant during a transition from one fueling mode to another. Such proposals suffer from a number of drawbacks, for example, gas lambda may fall outside of a desired range for a selected gaseous fuel quantity and since airflow control devices are incapable of adjusting airflow to the cylinders rapidly enough to obtain a desired lambda for a selected quantity of fuel. As a result, the engine may exhibit power surges and droops even if total fuel energy content remains constant. Other proposals seek to overcome these drawbacks by accounting for other engine operating parameters, for example, primary fuel excess air ratio sometimes referred to as lambda. Yet such proposals fail to account for multiple factors impacting combustion. Variations in fuel composition and energy content may add significant error to controls based upon fuel energy content and/or lambda. For example, when natural gas is utilized as a fuel source, variation in both energy content and fuel density may be encountered due to variation in the relative amount of methane and propane present in the fuel. Variation in the Cetane rating of diesel fuel may also occur. Variations in oxygen concentration due to changes in altitude may also introduce error. Variation in charge air density due to temperature and humidity variations presents a further source of error. Existing control proposals fail to account for or effectively accommodate such variability. Furthermore, existing control techniques including total fuel energy content controls and/or lambda control fail to adequately account for and mitigate post-cylinder engine emissions including, for example, hydrocarbon slip, engine NOx out, and other engine emissions. There remains a significant need for the unique controls methods, systems, and apparatuses disclosed herein.

DISCLOSURE

For the purposes of clearly, concisely and exactly describing exemplary embodiments of the invention, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the invention is thereby created, and that the invention includes and protects such alterations, modifications, and further applications of the exemplary embodiments as would occur to one skilled in the art

SUMMARY

Unique apparatuses, methods and systems for controlling operation of dual fuel engines are disclosed. One embodiment is a unique method for controlling operation of a dual fuel engine based upon a combustion index value. The combustion index may be empirically determined to provide desired engine operation at a plurality of ratios of gaseous fuel and liquid fuel. The desired engine operation may include a number of criteria including, for examiner an engine knock criterion and/or an exhaust emissions criterion. The combustion index value may be determined during operation of the engine based upon measured, estimated or predicted engine operating parameters. The combustion index value may be utilized to interpolate between a first engine operating map for a first ratio of gaseous fuel and liquid fuel and a second engine operating map for a second ratio of gaseous fuel and liquid fuel. Further embodiments, forms, objects, features, advantages, aspects, and benefits shall become apparent from the following description and drawings.

DETAILED DESCRIPTION

Figure 1:
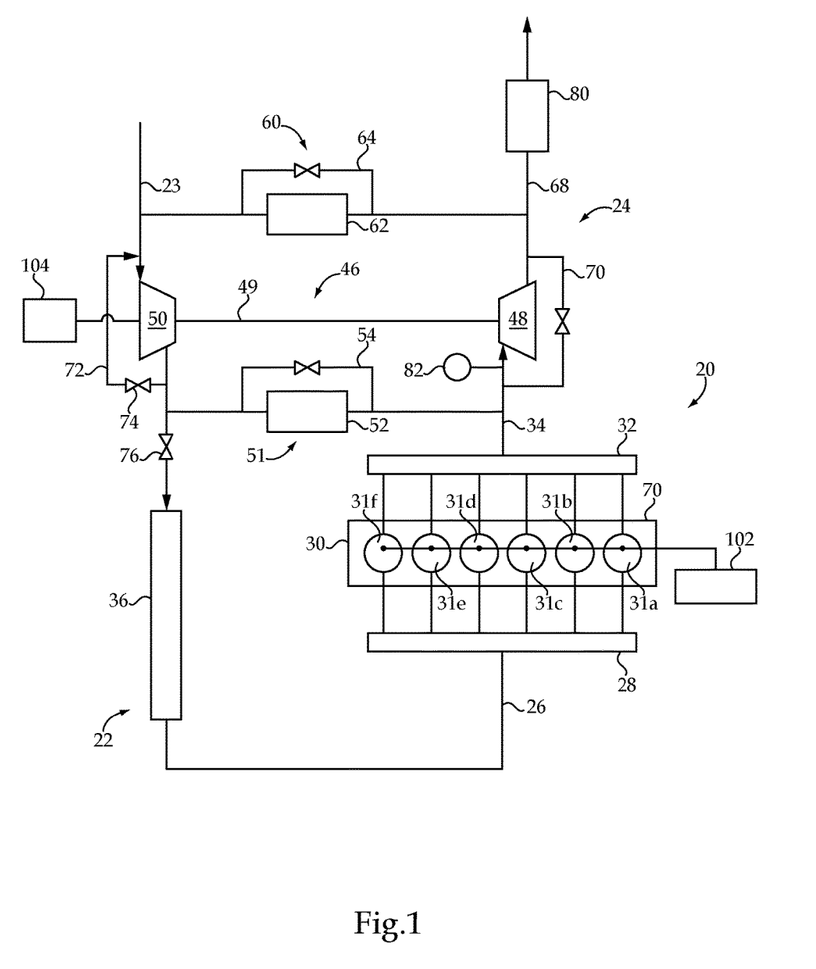
FIGS. 1 and 2 schematically illustrate certain aspects of an exemplary dual fuel internal combustion engine system.
Figure 2:
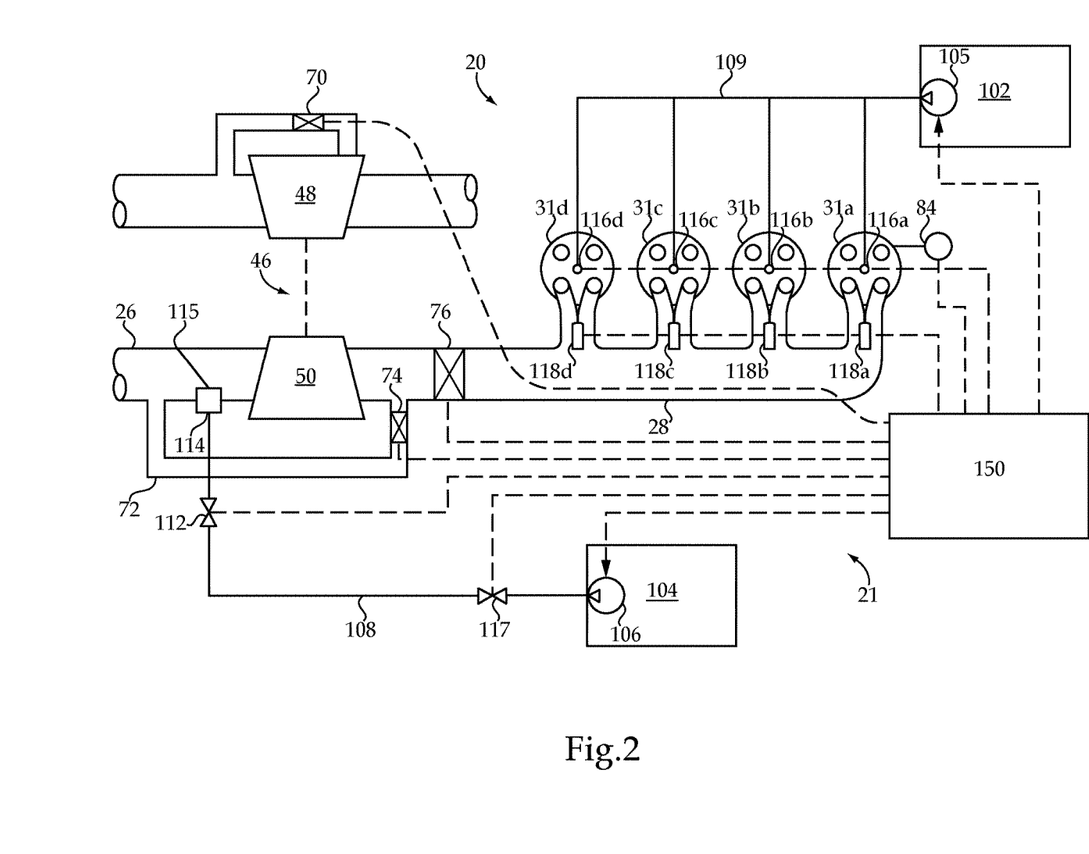

With reference to FIGS. 1 and 2, an internal combustion engine system 20 is illustrated in schematic form. A fueling system 21 (FIG. 2) is also shown in schematic form that is operable with internal combustion engine system 20 to provide fueling for a dual fuel engine 30 from a first fuel source 102 and a second fuel source 104. Internal combustion engine system 20 includes dual fuel engine 30 connected with an intake system 22 for providing a charge flow to engine 30 and an exhaust system 24 for output of exhaust gases. In certain embodiments, the duel fuel engine 30 includes a lean combustion engine such as a diesel cycle engine that uses a primary or first fuel that is a liquid fuel such as diesel fuel and a secondary or second fuel that is a gaseous fuel such as natural gas. The second fuel can be a gaseous fuel, for example, natural gas, bio-gas, commercially available gas, methane, ethane, propane (LPG), butane, ethanol, producer gas, field gas, nominally treated field gas, well gas, nominally treated well gas, liquefied natural gas (LNG), compressed natural gas, landfill gas, condensate, coal-bed methane (CBM), liquid fuels that are readily vaporized (such as gasoline), and mixtures of these. However, other types of first and second fuels are not precluded. In certain embodiments, the first fuel is a fuel suitable for lean burning, and the second fuel is a fuel that utilizes stoichiometric or near-stoichiometric combustion except when combined with the first fuel during a dual fueling operation. In the illustrated embodiment, the dual fuel engine 30 includes six cylinders 31a-31f in an in-line arrangement. However, the number of cylinders (collectively referred to as cylinders 31) may be any number, and the arrangement of cylinders 31 may be any arrangement, and is not limited to the number and arrangement shown in FIG. 1.

Dual fuel engine 30 includes an engine block 70 that at least partially defines the cylinders 31a, 31b, 31c, 31d, 31e, 31f (collectively referred to as cylinders 31.) A plurality of pistons (not shown) may be slidably disposed within respective cylinders 31 to reciprocate between a top-dead-center position and a bottom-dead-center position. Each of the cylinders 31, its respective piston, and the cylinder head form a combustion chamber. In the illustrated embodiment, engine 30 includes six such combustion chambers. However, it is contemplated that engine 30 may include a greater or lesser number of cylinders and combustion chambers and that cylinders and combustion chambers may be disposed in an "in-line" configuration, a "V" configuration, or in any other suitable configuration.

In one embodiment, dual fuel engine 30 is a four stroke engine. That is, for each complete engine cycle (i.e., for every two full crankshaft rotations), each piston of each cylinder 31 moves through an intake stroke, a compression stroke, a combustion or power stroke, and an exhaust stroke. Thus, during each complete cycle for the depicted six cylinder engine, there are six strokes during which air is drawn into individual combustion chambers from intake supply conduit 26 and six strokes during which exhaust gas is supplied to exhaust manifold 32.

The dual fuel engine 30 includes cylinders 31 connected to the intake system 22 to receive a charge flow and connected to exhaust system 24 to release exhaust gases produced by combustion of the first and/or second fuels. Exhaust system 24 may provide exhaust gases to a turbocharger 46, although a turbocharger is not required. In still other embodiments, multiple turbochargers are included to provide high pressure and low pressure turbocharging stages that compress the intake flow.

Furthermore, exhaust system 24 can be connected to intake system 22 with one or both of a high pressure exhaust gas recirculation (EGR) system 51 and a low pressure EGR system 60. EGR systems 51, 60 may include a cooler 52, 62 and bypass 54, 64, respectively. In other embodiments, one or both of EGR systems 51, 60 are not provided. When provided, EGR system(s) 51, 60 provide exhaust gas recirculation to engine 30 in certain operating conditions. In any EGR arrangement during at least certain operating conditions, at least a portion the exhaust output of cylinder(s) 31 is recirculated to the engine intake system 22. In the high pressure EGR system 51, the exhaust gas from the cylinder(s) 31 takes off from exhaust system 24 upstream of turbine 48 of turbocharger 46 and combines with intake flow at a position downstream of compressor 50 of turbocharger 46 and upstream of an intake manifold 28 of engine 30. In the low pressure EGR system 60, the exhaust gas from the cylinder(s) 31a-31f takes off from exhaust system 24 downstream of turbine 48 of turbocharger 46 and combines with intake flow at a position upstream of compressor 50 of turbocharger 46. The recirculated exhaust gas may combine with the intake gases in a mixer (not shown) of intake system 22 or by any other arrangement. In certain embodiments, the recirculated exhaust gas returns to the intake manifold 28 directly.

Intake system 22 includes one or more inlet supply conduits 26 connected to an engine intake manifold 28, which distributes the charge flow to cylinders 31 of engine 30. Exhaust system 24 is also coupled to engine 30 with an engine exhaust manifold 32. Exhaust system 24 includes an exhaust conduit 34 extending from exhaust manifold 32 to an exhaust valve. In the illustrated embodiment, exhaust conduit 34 extends to turbine 48 of turbocharger 46. Turbine 48 includes a valve such as controllable wastegate 70 or other suitable bypass that is operable to selectively bypass at least a portion of the exhaust flow from turbine 48 to reduce boost pressure and engine torque under certain operating conditions. In another embodiment, turbine 48 is a variable geometry turbine with a size-controllable inlet opening. In other embodiments, the exhaust valve is an exhaust throttle and/or wastegate. While specific examples have been discussed, no particular form of intake or exhaust control valving is required, nor is the use of the same precluded.

An aftertreatment system 80 can be connected with an outlet conduit 68. The aftertreatment system 80 may include, for example, oxidation devices (DOC), particulate removing devices (DPF, CDPF), constituent absorbers or reducers (SCR, AMOX, LNT), reductant systems, and other components if desired.

In one embodiment, exhaust conduit 34 is flow coupled to exhaust manifold 32, and may also include one or more intermediate flow passages, conduits or other structures. Exhaust conduit 34 extends to turbine 48 of turbocharger 46. Turbocharger 46 may be any suitable turbocharger known in the art, including fixed-geometry turbocharger, variable-geometry turbine turbochargers and waste-gated turbochargers. Turbocharger 46 may also include multiple turbochargers. Turbine 48 is connected via a shaft 49 to compressor 50 that is flow coupled to inlet supply conduit 26.

Compressor 50 receives fresh air flow from intake air supply conduit 23. Second fuel source 104 may also be flow coupled at or upstream of the inlet to compressor 50 or downstream of compressor 50, as discussed further below. Intake system 22 may further include a compressor bypass 72 that connects a downstream or outlet side of compressor 50 to an upstream or inlet side of compressor 50. Compressor bypass 72 includes a control valve 74 that is selectively opened to allow charge flow to be returned to the inlet side of compressor 50 to reduce compressor surge under certain operating conditions, such as when an intake throttle 76 is closed. Inlet supply conduit 26 may include a charge air cooler 36 downstream from compressor 50 and intake throttle 76. In another embodiment, a charge air cooler 36 is located in the intake system 22 upstream of intake throttle 76. Charge air cooler 36 may be disposed within inlet air supply conduit 26 between engine 30 and compressor 50, and embody, for example, an air-to-air heat exchanger, an air-to-liquid heat exchanger, or a combination of both to facilitate the transfer of thermal energy to or from the flow directed to engine 30.

In operation of internal combustion engine system 20, fresh air is supplied through inlet air supply conduit 23. The fresh air flow or combined flows can be filtered, unfiltered, and/or conditioned in any known manner, either before or after mixing with the EGR flow from EGR systems 51, 60 when provided. The intake system 22 may include components configured to facilitate or control introduction of the charge flow to engine 30, and may include intake throttle 76, one or more compressors 50, and charge air cooler 36. The intake throttle 76 may be connected upstream or downstream of compressor 50 via a fluid passage and configured to regulate a flow of atmospheric air and/or combined air/EGR flow to engine 30. Compressor 50 may be a fixed or variable geometry compressor configured to receive air or air and fuel mixture from fuel source 104 and compress the air or combined flow to a predetermined pressure level before engine 30. The charge flow is pressurized with compressor 50 and sent through charge air cooler 36 and supplied to engine 30 through intake supply conduit 26 to engine intake manifold 28.

With further reference to FIG. 2, fuel system 21 is configured to provide dual fuelling of engine 30. Only four cylinders 31a, 31b, 31c, 31d are shown in FIG. 2, it being understood that if additional cylinders, such as cylinders 31e and 31f, or fewer cylinders, are provided they are arranged in a manner similar to the illustrated cylinders 31. Fuel system 21 includes first fuel source 102 and second fuel source 104. First fuel source 102 is configured to provide a flow of a first fuel to cylinders 31 with one or more injectors at or near each cylinder. Second fuel source 104 is connected to intake system 22 with a mixer or connection at or adjacent an inlet of compressor 50. In certain embodiments, the cylinders 31 each include at least one direct injector for delivering fuel to the combustion chamber thereof from a primary fuel source, such as first fuel source 102. In addition, one or more control valves, port injectors and/or mixers can be provided for delivery or induction of fuel from the second fuel source 104 with the charge flow delivered to cylinders 31. Such devices may be electronically controllable and may include one or more actuators for controlling flow of fuel from the second fuel source 104. In certain forms at least one of a port injector at each cylinder or a mixer at an inlet of compressor 50 are provided for delivery or induction of fuel from the second fuel source 104 with the charge flow delivered to cylinders 31.

The fueling from the first fuel source 102 is controlled to provide the sole fueling at certain operating conditions of engine 30, and fueling from the second fuel source 104 is provided to substitute for fueling from the first fuel source 102 at other operating conditions to provide a dual flow of fuel to engine 30. In embodiments where the first fuel source 102 is diesel fuel and the second fuel source 104 is natural gas, a control system including controller 150 is configured to control the flow of liquid diesel fuel from first source 102 and the flow of gaseous fuel from second source 104 in accordance with the controls disclosed herein.

A direct injector, as utilized herein, includes any fuel injection device that injects fuel directly into a cylinder, and is capable of delivering fuel into the cylinder when the intake valve(s) and exhaust valve(s) are closed. The direct injector may be structured to inject fuel at the top of the cylinder or laterally of the cylinder. In certain embodiments, the direct injector may be structured to inject fuel into a combustion pre-chamber. Each cylinder 31 may include one or more direct injectors 116a-116d, respectively. The direct injectors 116a-116d may be the primary fueling device for first fuel source 102 for the cylinders 31.

A port injector, as utilized herein, includes any fuel injection device that injects the second fuel outside the engine cylinder in the intake manifold to form the air-fuel mixture. The port injector injects the fuel towards the intake valve. During the intake stroke, the downwards moving piston draws in the air/fuel mixture past the open intake valve and into the combustion chamber. Each cylinder 31a, 31b, 31c, 31d may include one or more port injectors 118a, 118b, 118c, 118d, respectively. In one embodiment, the port injectors 118a-118d may be the primary fueling device for second fuel source 104 to the cylinders 31. In another embodiment, the second fuel source 104 can be connected to intake system 22 with a mixer 115 at a gaseous fuel connection 114 upstream of intake manifold 28, such as at the inlet of or upstream of compressor 50. A flow control valve 117 can be provided to control the flow of gaseous fuel to engine 30 from second fuel source 104.

In certain embodiments, each cylinder 31 includes at least one direct injector that is capable of providing all of the designed fueling amount from first fuel source 102 for the cylinders 31 at any operating condition. Second fuel source 104 provides a flow of a second fuel to each cylinder 31 through a port injector or a natural gas connection upstream of intake manifold 28 to provide a second fuel flow to the cylinders 31 to achieve desired operational outcomes, such as improved efficiency, improved fuel economy, improved high load operation, and other outcomes.

One embodiment of system 20 includes fuel system 21 with at least one fuel source 102 to provide a first fuel flow to all the cylinders 31 and a second fuel source 104 that provides a second fuel flow to all the cylinders 31 in addition to the first fuel flow under certain operating conditions. First fuel source 102 includes a first fuel pump 105 that is connected to controller 150, and the second fuel source 104 includes, in one embodiment, a second fuel pump 106 that is connected to controller 150. Each of the cylinders 31 includes an injector, such as direct injectors 116a-116d associated with each of the illustrated cylinders 31a-31d of FIG. 2. Direct injectors 116a-116d are electrically connected with controller 150 to receive fueling commands that provide a fuel flow to the respective cylinder 31 in accordance with a fuel command determined according to engine operating conditions and operator demand by reference to fueling maps, control algorithms, or other fueling rate/amount determination source stored in controller 150. First fuel pump 105 is connected to each of the direct injectors 116a-116d with a first fuel line 109. First fuel pump 105 is operable to provide a first fuel flow from first fuel source 102 to each of the cylinders 31a-31d in a rate, amount and timing determined by controller 150 that achieves a desired power and exhaust output from cylinders 31.

If provided, second fuel pump 106 is connected to the inlet of compressor 50 with gaseous fuel connection 114 with a second fuel line 108 or to port injectors 118. A shutoff valve 112 can be provided in fuel line 108 and/or at one or more other locations in fuel system 21 that is connected to controller 150. Second fuel pump 106 is operable to provide a second fuel flow from second fuel source 104 in an amount determined by controller 150 that achieves a desired power and exhaust output from cylinders 31. In another embodiment, second fuel pump 106 is omitted and fuel is supplied to connection 114 or port injectors 118 under pressure from a pressurized second fuel source 104, and the flow of gaseous fuel from second fuel source 104 is controlled by flow control valve 117.

Controller 150 can be connected to actuators, switches, or other devices associated with fuel pumps 105, 106, shutoff valve 112, intake throttle 76, compressor bypass valve 74, shutoff valve 112, flow control valve 117, wastegate 70 and/or injectors 116, 118 and configured to provide control commands thereto that regulate the amount, timing and duration of the flows of the first and second fuels to cylinders 31, the charge flow, and the exhaust flow to provide the desired power and exhaust output. The positioning of each of shutoff valve 112, flow control valve 117, intake throttle 76, compressor bypass valve 74, wastegate 70, injectors 116, 118 and/or the on/off status of fuel pumps 105, 106 can be controlled via control commands from controller 150.

In other embodiments, a first subset of cylinders 31 is associated with a first cylinder bank (not shown) and a second subset of cylinders 31 is associated with a second cylinder bank. Accordingly, differing substitution rates of the gaseous fuel can be used for the cylinder banks. In certain embodiments of engines with multiple cylinder banks, the feed lines for the gaseous fuel can be separately controlled to each cylinder bank to provide the desired substitution rate of the gaseous fuel for the respective cylinder bank.

In certain embodiments of the systems disclosed herein, controller 150 is structured to perform certain operations to control engine operations and fueling of cylinders 31 with fueling system 21 to provide the desired operational outcomes. In certain embodiments, the controller 150 forms a portion of a processing subsystem including one or more computing devices having memory, processing, and communication hardware. The controller 150 may be a single device or a distributed device, and the functions of the controller 150 may be performed instructions provided on a computer readable storage medium. The controller 150 may be included within, partially included within, or completely separated from an engine controller (not shown). The controller 150 may be in communication with sensors and actuators of the systems disclosed herein in a variety of manners, including through direct communication, communication over a CAN bus or other datalink, and/or through communication with other controllers or portions of the processing subsystem that provide sensor and/or actuator information to the controller 150.

One of skill in the art, having the benefit of the disclosures herein, will recognize that the controllers, control systems and control methods disclosed herein are structured to perform operations that improve various technologies and provide improvements in various technological fields. Non-limiting examples of such technology improvements include improvements in combustion performance of dual fuel internal combustion engines, improvements in engine torque generation and torque control, engine fuel economy performance, improvements in engine noise and vibration control for dual fuel engines, improvements in performance or operation of aftertreatment systems and/or components of dual fuel engines, and/or improvements in emissions reduction in dual fuel engines. Without limitation, example and non-limiting technological fields that are improved include the technological fields of duel fuel internal combustion engines and related apparatuses and systems as well as vehicles including the same.

Certain operations described herein include operations to calculate and/or to determine one or more parameters. Calculating or determining, as utilized herein, includes receiving values by any suitable method, including at least receiving values from a datalink or network communication, receiving an electronic signal (e.g. a voltage, frequency, current, or PWM signal) indicative of the value, receiving a computer generated parameter indicative of the value, reading the value from a memory location on a non-transient computer readable storage medium, receiving the value as a run-time parameter by any means known in the art, and/or by receiving a value by which the interpreted parameter can be calculated, and/or by referencing a default value that is interpreted to be the parameter value.

The schematic flow descriptions which follow provide illustrative embodiments of methods for controlling fuelling during a dual fuelling mode of operation of internal combustion engine system 20. As used herein, a dual fuel system 21 is a fueling system in which a dual fueling mode is provided where each of the cylinders 31 of engine 30 receives a first fuel flow and a second fuel flow in addition to the first fuel flow under certain operating conditions. However, it is contemplated that the dual fueling system 21 can be operated in a single fuel mode from first fuel source 102 upon operator selection or certain operating conditions. Operations illustrated are understood to be exemplary only, and operations may be combined or divided, and added or removed, as well as re-ordered in whole or part, unless stated explicitly to the contrary herein. Certain operations illustrated may be implemented by a computer or controller apparatus embodiment of controller 150 executing a computer program product on a non-transient computer readable storage medium, where the computer program product comprises instructions causing the computer to execute one or more of the operations, or to issue commands to other devices to execute one or more of the operations.

The controller 150 may be configured to provide control commands that regulate the amount, timing, and duration of the flows of the first and secondary fuels to cylinders 31, the charge flow, and the exhaust flow to at least attempt for the engine system 20 to provide a desired torque and exhaust output. Accordingly, the controller 150 can be connected to various actuators, switches, sensors, or other devices associated with control of the flow, delivery, injection, or flow of air, fuel, and/or exhaust. For example, according to certain embodiments, the controller 150 may be in operable communication with fuel pumps 105, 106, shutoff valves, flow control valves, the intake throttle 76, bypass valves associated with the compressor 50, a wastegate, port injectors 118, and/or fuel injectors 116. Additionally, according to certain embodiments, the controller 150 may issue commands that cause the operation of a first fuel pump 105 associated with the first fuel reservoir 110 so that first fuel flows from the first fuel reservoir 110 along a fuel line and to the fuel injectors 116. The controller 150 may also control the injection of first fuel by the fuel injectors 116 into the combustion chambers in a rate, amount and timing determined by controller 150 that may achieve a desired torque and exhaust output from cylinders 31. According to certain embodiments, the controller 150 may also control the operation of a second fuel pump 106 that is used to deliver secondary fuel from the secondary fuel reservoir 104 to an inlet of the compressor 50 in an amount determined by controller 150 that may achieve a desired torque and exhaust output from cylinders 31. According to other embodiments, the second fuel pump 106 is omitted, and the supply or delivery of secondary fuel is provided by pressure that pressurizes secondary fuel in the secondary fuel reservoir 104.

The controller 150 may also be operably connected to a variety of different sensors that detect and/or provide information relating to the operation of the engine system 20. For example, the controller 150 may be operably connected to a throttle sensor that detects the position of a throttle 76, which may reflect the position of an accelerator pedal. Additionally, the intake system 22 may include one or more intake air temperature sensors and one or more intake pressure sensors that may provide information to the controller 150 relating to the temperature(s) and pressure, respectively, of the air and/or the air-fuel mixture that will be, or is, delivered to the combustion chamber. Similarly, one or more exhaust temperature sensors may be positioned along the exhaust system 24, including the after-treatment system 80, that provide information to the controller 150 relating to the exhaust gas temperature(s). The exhaust system 24, including the after-treatment system 80, may also have one or more $NO_x$ sensors 146 that provide information relating to engine-out and/or system-out $NO_x$ levels, and which may also be used by the controller 150 to determine levels of hydrocarbon slip. The engine system 20 may also include one or more crank shaft speed and/or position sensors that may provide information to the controller 150 that is used to determine engine misfire. Additionally, according to certain embodiments, a knock sensor may provide information for the controller 150 relating to engine knock.

In certain embodiments, when the engine system 20 is controlled in a first fuel mode such that a first fuel (e.g., diesel fuel) is the primary or sole fuel supplied to the engine 30, the controller 150 may reference a first fuel table which may comprise one or more fueling tables, maps, models, control algorithms, or other fueling rate/amount determination sources to determine one or more fuel injection parameters. For example, the controller 150 may reference a first fuel table stored in a non-transitory memory structure to determine one or more injection parameters relating to the timing, amount, and/or pressure at which first fuel is to be injected into the combustion chambers by the fuel injectors 116. The determined injection parameter(s) may be used by the controller 150 to control the operation of systems 20 and 21 to attempt to provide a desired torque and/or exhaust output from the engine system 20. For example, the controller 150 may use the determined injection parameter to provide commands associated with the timing and duration at which the fuel injectors 116 are to inject fuel into the combustion chambers.

Similarly, when the engine system 20 is controlled to operate in a second fuel mode such that a combination of the first fuel and a second fuel (e.g., a gaseous fuel) is supplied to the engine 30, the controller 150 may reference one or more dual-fuel tables which may comprises other fueling tables, maps, models, control algorithms, or other fueling rate/amount determination sources to determine injection parameters for the first fuel while the engine system 20 is operating in the dual-fuel mode. Similar to the first fuel table, the dual-fuel table may be utilized to determined injection parameter(s) that are used by the controller 150 to control the operation of the engine system 20, including the dual source fueling system 21, in at least an attempt to attain desired torque and/or exhaust output from the engine 30, including, for example, operation parameters relating to the injection of first fuel into the combustion chambers by the fuel injectors 116. Additionally, according to certain embodiments, the dual-fuel table may provide parameters used by the controller 150 to determine the ratio of air to secondary fuel that is released by the port injector 118. It shall be appreciated that the first fuel table and the one or more dual-fuel table disclosed herein are examples of first operating tables and second operating tables, respectively, which may be utilized in controlling fueling during different engine operating modes.

A transition period may occur as the engine system 20 changes or switches from one fuel mode to another fuel mode. For example, a transition period may occur as the ratio of first fuel to secondary fuel in the combustion chambers changes as engine system 20 transitions from the first fuel mode to the second fuel mode, and vice versa. However, such transitions may adversely impact the performance of the engine system 20, including, for example, the ability of the engine 30 to provide desired torque and emission outputs. Moreover, during such transition periods, neither the first fuel table nor the dual-fuel table may accurately indicate injection parameters that will allow the engine system 20 to attain desired torque and exhaust output from the engine 30. Further, during such transitions, the engine 30 may become more susceptible to misfire, engine knock, reductant slippage, and other transient emission events. Moreover, the inventors have discovered that during such transition periods empirical performance of the engine may deviate from what is predicted by various mathematical models including those of existing control approaches owing to the impact of and interplay between a multiplicity of confounding transient variations.

To address the potential for such adverse events occurring while the engine system 20 transitions between different fuel modes, exemplary embodiments utilize a combustion index (CI) that is representative of the performance characteristics of the engine 30 under a variety of different engine operating conditions during the transitions between fueling modes. According to certain embodiments, the CI may be utilized to determine control parameters by interpolating between the first fuel table and the dual-fuel table. The control parameters determined by such interpolation may reflect operating parameters and/or conditions that attain particular engine system 20 operating characteristics, such as, for example, engine performance and/or combustion characteristics, as the ratio of first fuel to secondary fuel changes during the transition between fuel modes. Additionally, each target CI value may represent or result in output or generation of a single control value or multiple control values.

In a preferred embodiment, CI values may be empirically derived based on testing, actual and/or virtual, of the engine system 20 during various stages of the transition between fuel modes and under a variety of different operating conditions. Such testing is used to derive one or more relationships, which may be expressed as the one or more fuel transition algorithms, that are indicative of the impact, during the transition between fuel modes, that changes in a variety of different independent operating parameters have, or do not have, on engine performance and/or combustion characteristics. According to certain embodiments, the independent operating parameters may be selected based on the ability to controller 150 to control the level, ratios, and/or amounts of those parameters. For example, independent operating parameters may include, but are not limited, one or more of the following: start of injection timing (SOI), injection pressure, duration of injection, amount of injected fuel, air-fuel ratio, intake manifold temperature, rate of charge flow, rate of gas flow, throttle position, fuel energy, and/or injection strategies, such as, for example, pilot, main, and/or post fuel injection strategies. Additionally, the independent operating parameters used to determine the fuel transition algorithm(s), referred to herein as the selected operating parameters, may be based on actual measured values, virtual values, and/or a combination thereof.

The evaluation of the impact of altering independent operating parameters has on combustion characteristics may include selecting various combinations of independent operating parameters and/or using various ratios, levels, and/or amounts of the selected independent operating parameters during various stages of the transition between fuel modes. More specifically, a relationship or the impact between selected independent parameters and the engine performance or combustion characteristics may be derived by testing numerous combinations and ratios of selected independent operating parameters at various first and secondary fuel ratios. Additionally, while the number of independent operating parameters selected to generate the relationship between independent parameters and the resulting engine performance characteristics at various stages of the fuel mode transition may vary, according to certain embodiments, an increase in the number of selected independent operating parameters may improve the accuracy of the derived relationship, and more specifically, the accuracy of the fuel transition algorithm(s).

The effect of variations in, or combinations of, one or more of the selected independent operating parameters has on engine performance and/or combustion characteristics may be determined in a variety of different manners. For example, according to certain embodiments, engine performance or combustion characteristics of the engine 30 may be determined by evaluating one or more dependent operating parameters, which may be parameters that are impacted or otherwise altered as a consequence to variations and/or combinations of the selected independent operating parameters. A variety of dependent operating parameters may be evaluated, including, for example, one or more of the following: exhaust gas temperature, intake manifold pressure, rail pressure, engine output load/power/torque, engine misfire, engine knock, and/or the composition of the exhaust gas at any number of locations along the exhaust and/or after-treatment systems 24, 80, including, for example, $NO_x$ levels and/or levels of reductant slippage. Additionally, evaluation of the dependent operating parameters may include evaluating actual measured values, virtual values, and/or a combination thereof.

The information obtained from evaluating the impact altering or adjusting the combinations, ratios, and/or amounts of selected independent operating parameters has during transition between fuel modes may then be used to derive the one or more fuel transition algorithms. For example, according to certain embodiments, multivariate regression, correlation, and/or dependence analysis of the obtained information may be employed to derive one or more fuel transition algorithms that correspond to the impact the selected independent operating parameters during the transition between fuel modes have on the associated engine performance characteristics, which may include, for example, the characteristics of the combustion event.

According to certain embodiments, in addition, or in lieu of, using interpolation to derive deriving target CI values, as previously discussed, target CI values may be derived through use of the fuel transition algorithm(s). For example, values and/or combinations of values for the selected independent operating parameters that are known to produce certain engine performance characteristics, such as, for example, desired characteristics, may be applied to the fuel transition algorithm(s) to attain target CI values and/or ranges of target CI values. Additionally, in addition to, or in lieu of selected independent operating parameters, dependent operating parameters that are known to be associated with desired engine operating and/or combustion characteristics may also be applied to the fuel transition algorithms(s) to attain target CI values. For example, if the statistical relationship was derived using the selected independent operating parameters of SOI and fuel energy, and various combinations, ratios, or levels of SOI and fuel energy are known to produce desirable combustion characteristics, those particular combinations of selected independent parameters may be applied to the one or more fuel transition algorithms to derive one or more target CI values.

As numerous settings, levels, amounts, and/or ratios of different independent and/or dependent operating parameters during different stages of the transition between fuel modes may result in different desirable engine performance characteristics, the target CI values may extend across different ranges of CI values. Thus, according to certain embodiments, the CI may include target CI values that correspond to different stages of the transition between fuel modes. Alternatively, according to other embodiments, the target CI values may span across at least a majority, if not all, of the transition stage between the first fuel mode.

Figure 3:
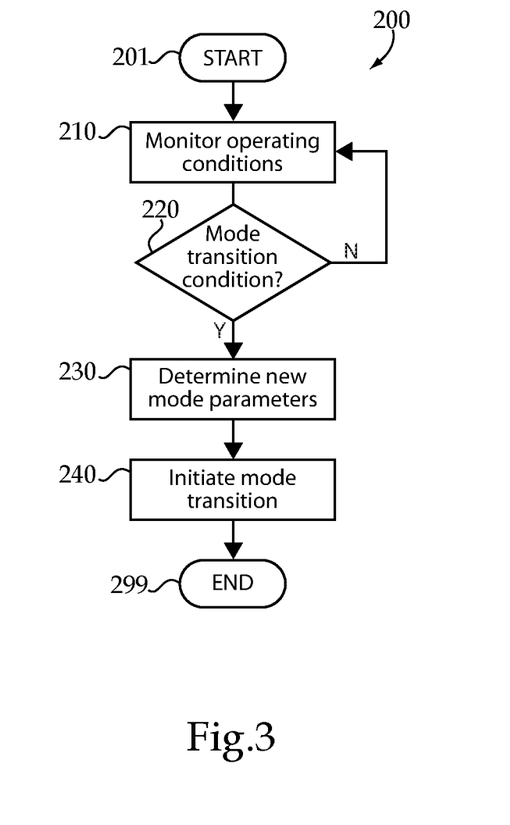
FIG. 3 illustrates an exemplary control process for a dual fuel internal combustion engine system.

With reference to FIG. 3 there is illustrated a flow diagram according to an exemplary controls process 200. Process 200 begins at operation 201 which starts operation of a dual fuel engine system structured to selectably combust a plurality of ratios of a liquid fuel and a gaseous fuel such as, for example, the systems described above in connection with FIGS. 1 and 2. In certain forms operation 201 starts operation of a dual fuel engine in a liquid fuel only mode and controls injection of liquid fuel, such as diesel fuel, into cylinders of the engine using a first engine operating map which provides engine operating parameters for liquid fuel-only engine operation. In a preferred form the first engine operating map is provided as a set of Chi surfaces which specify pre-injection timing, pre-injection quantity, main injection timing, main injection quantity, post injection timing, post injection quantity, and injector rail pressure as a function of engine speed and fueling, as a function of engine speed and torque, or as a function of engine speed and another parameter related to torque and/or fueling.

From operation 201, process 200 proceeds to operation 210 which monitors the operation of the engine and/or one or more systems associated therewith to provide information for determining whether a transition mode condition is true. From operation 210, process 200 proceeds to conditional 220 which evaluates whether the transition mode condition is true. Transition mode condition evaluations may be made based upon criteria such as achieving stable diesel combustion, achieving desired engine speed, absence of transient conditions, availability of gaseous fuel, and/or opening of a gaseous fuel valve or a command therefor.

If conditional 220 determines that the transition mode condition is not true, process 200 returns to operation 210 and repeats as described above. If conditional 220 determines that the transition mode condition is true, process 200 returns to operation 210, process 200 proceeds to operation 230 which determines a new operating mode parameters. In a preferred embodiment, the operating mode parameters determined by operation 230 comprise a combustion index, such as empirically determined combustion index CI. In certain preferred forms the combustion index is a dimensionless combustion index. The combustion index may be determined based on a number of different inputs or criteria which are distinct from charge lambda (including gaseous fuel lambda, liquid fuel lambda, diesel lambda, charge lambda or total lambda). This provides an alternative to controls which utilize lambda in controlling fueling mode transitions. The combustion index may be utilized to adjust liquid fuel or diesel injection characteristics (such as start of injection timing, injection pressure, multiple injection event durations and timing, etc.) for the purpose of controlling dual-fuel engine operation including the transition from diesel-only through dual-fuel operating modes. The parameters that may be utilized as inputs into the combustion index may comprise one or more of the following: gas flow, intake manifold temperature, exhaust temperature, intake manifold pressure, charge flow (measured or virtual), engine output load/power (measured or virtual), fuel energy, all of which may be determined by measurements or information provided by one or more physical sensors, virtual sensors or a combination thereof.

The combustion index may be determined in a number of manners. Certain embodiments, use of statistical regression methods for computing the combustion index. In one illustrative example, using selected parameters for dual-fuel combustion such as gas mass flow rate, intake manifold pressure a combustion index (CI) can be computed. The form of the regression may be: $CI = a_1 (\dot{m}_{gas}) + a_2(P_{im}) + a_3$ (KI)+$a_4$(KI*$P_{im}$)+ ... where, $\dot{m}_{gas}$ is the natural gas mass flow, $P_{im}$ is the intake manifold pressure and KI is a measure of the knock in the cylinder. Other critical parameters such as exhaust gas temperature, fuel rail pressure and engine output such as load/power/torque/NOx or $O_2$ concentration could be added to the above regression equation as needed. The CI could be used to interpolate between various tables used for the combustion set-points (e.g., SOI).

In other embodiments the CI may be determined based on the following regression model: CI=$a_1$(A)+$a_2$(B)+$a_3$(C)+$a_4$(A*B)+$a_5$*$A^2$+$a_5$*$A^2$B+ ... where, the input signals for the regression model are combinations of the key signals. For example, $$B = \frac{\dot{m}_{gas\text{-}measured}}{\dot{m}_{gas\text{-}Estimated} * \left(\frac{\text{Demand } Trq}{\text{Estim } Trq}\right)}$$

Such embodiments the information on the output of the engine (e.g., torque) and the measure of the gas mass flow to help with the input of the CI. For example, the gas flow for a given demanded torque and gas quality will deliver a particular torque and the ratio of the demanded torque to the estimate for a given gas mass flow helps with the computation of the combustion index.

Other embodiments may determine the CI based on the Normalized form of the equation:

$$CI = \frac{(\dot{m}_{gas\text{-}estimated})}{(\dot{m}_{gas\text{-}pipe})}$$

where, $\dot{m}_{gas\text{-}estimated}$=f(Demanded Trq, estimated Trq) and $\dot{m}_{gas\text{-}pipe}$=f(Gas mass flow sensor) is measured using the gas mass flow sensor. The lower heating value (LHV) is a parameter that could impact both the numerator and denominator (measured vs actual).

From operation 230, process 200 proceeds to operation 240 which initiates a fueling mode transition utilizing the mode parameter(s) determined in operation 230. In a preferred embodiment, the mode parameter is utilized to interpolate between two or more sets of operating tables. In one preferred form the sets of operating tables comprise Chi surfaces which specify pre-injection timing, pre-injection quantity, main injection timing, main injection quantity, post injection timing, post injection quantity, and injector rail pressure as a function of engine speed and fueling, as a function of engine speed and torque, or as a function of engine speed and another parameter related to torque and/or fueling. From operation 230 process 200 proceeds to operation 299 where it ends or, alternatively returns to a preceding point in process 200. It shall be further appreciated that if process 200 ends it may be re-called or re-executed at a later point during operation of the engine system.

Figure 4:
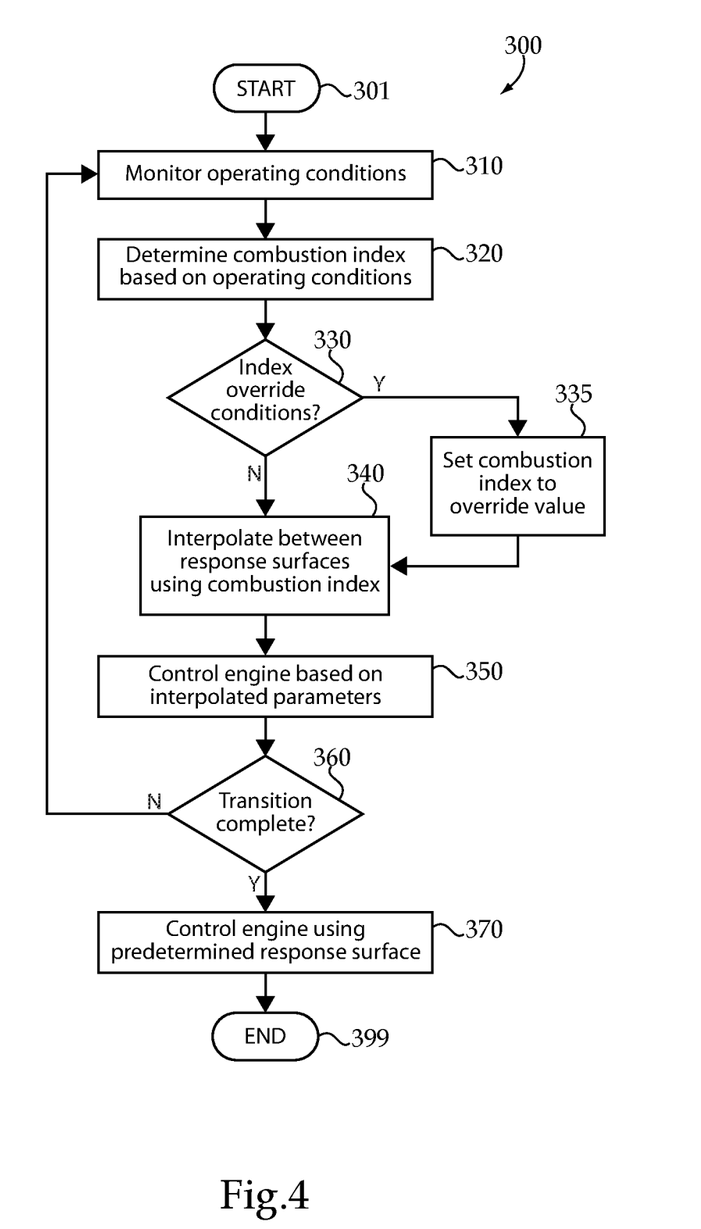
FIG. 4 illustrates an exemplary control process for a dual fuel internal combustion engine system.

With reference to FIG. 4 there is illustrated a flow diagram according to an exemplary controls process 300. Process 300 begins at operation 301 which starts operation of a dual fuel engine system structured to selectably combust a plurality of ratios of a liquid fuel and a gaseous fuel such as, for example, the systems described above in connection with FIGS. 1 and 2. In certain forms operation 301 starts operation of a dual fuel engine in a liquid fuel only mode and controls injection of liquid fuel, such as diesel fuel, into cylinders of the engine using a first engine operating map which provides engine operating parameters for liquid fuel-only engine operation. In a preferred form the first engine operating map is provided as a set of Chi surfaces which specify pre-injection timing, pre-injection quantity, main injection timing, main injection quantity, post injection timing, post injection quantity, and injector rail pressure as a function of engine speed and fueling, as a function of engine speed and torque, or as a function of engine speed and another parameter related to torque and/or fueling.

From operation 301, process 300 proceeds to operation 310 which monitors the operation of the engine and/or one or more systems associated therewith to provide information for determining whether a transition mode condition is true. From operation 310, process 300 proceeds to operation 320 which determines a combustion index based upon one or more parameters such as those determined by operation 310. The determination technique utilized by operation 320 may be the same or similar to those techniques described above in connection with operation 230.

From operation 320, process 300 proceeds to conditional 330 which evaluates whether combustion index override conditions are present. Example combustion index override conditions include engine knock above a magnitude threshold and/or frequency threshold. If conditional 330 determines that combustion index override conditions are not present, process 300 proceeds to operation 340. If conditional 330 determines that combustion index override conditions are present, process 300 proceeds to operation 335 which sets the combustion index to an override value. The override value may be selected to provide a conservative interpolation value to mitigate the occurrence of engine knock. From operation 335, process 300 proceeds to operation 340.

Operation 340 performs an interpolation between tables or response surfaces (e.g., Chi tables) using the combustion index value determined either in operation 320 or operation 335. The interpolation technique may be linear or non-liner and may be between two or more tables or response surfaces. The interpolation technique may be performed for tables or response surfaces for any controller parameters including those disclosed herein. From operation 340, process 300 proceeds to operation 350 which controls the engine using the interpolated parameters. From operation 350 process 300 proceeds to conditional 360 which evaluates whether a fueling mode transition is complete, for example, whether the interpolation has reached the point that the system is operating from a maximum substitution rate. If conditional 360 determines that the transition is not complete, process 300 returns to operation 310 and proceeds as described above. If operation 360 determines that transition 360 is compete, process 300 proceeds to operation 370 which controls engine operation using a predetermined table or response surface such as the maximum substitution rate table or response surface. From operation 370 process 300 proceeds to operation 399 where it ends or, alternatively returns to a preceding point in process 300. It shall be further appreciated that if process 300 ends it may be re-called or re-executed at a later point during operation of the engine system.

Figure 5:
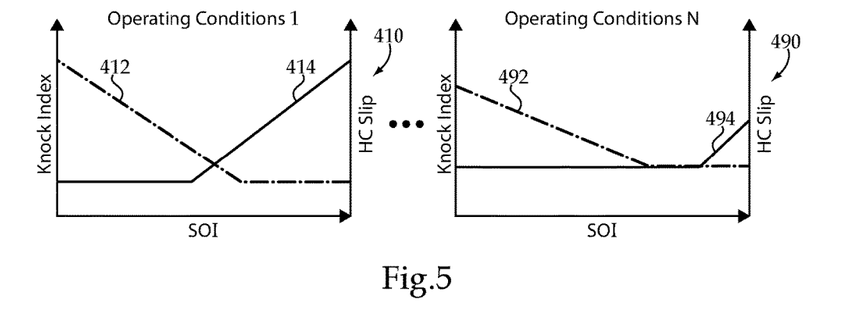
FIG. 5 illustrates graphs depicting the relationship between start of injection and engine knock and hydrocarbon slip for a plurality of engine operating conditions.

With reference to FIG. 5 there are illustrated graphs 410 and 490 which illustrate start of injection on their independent variable X axes, and engine knock index and hydrocarbon slip on their dependent variable Y axes for a plurality of different operating conditions. Curves 412 and 492 illustrate relationship between the knock index and start of injection for different operating conditions. Curves 414 and 494 illustrate the relationship between hydrocarbon slip and start of injection for a plurality of engine operating conditions. The information and relationships provided by graphs 410 and 490 may also be provided for a plurality of other engine operating conditions. This information may be utilized to select a start of injection timing which meets both an engine knock and a hydrocarbon slip target.

Figure 6:
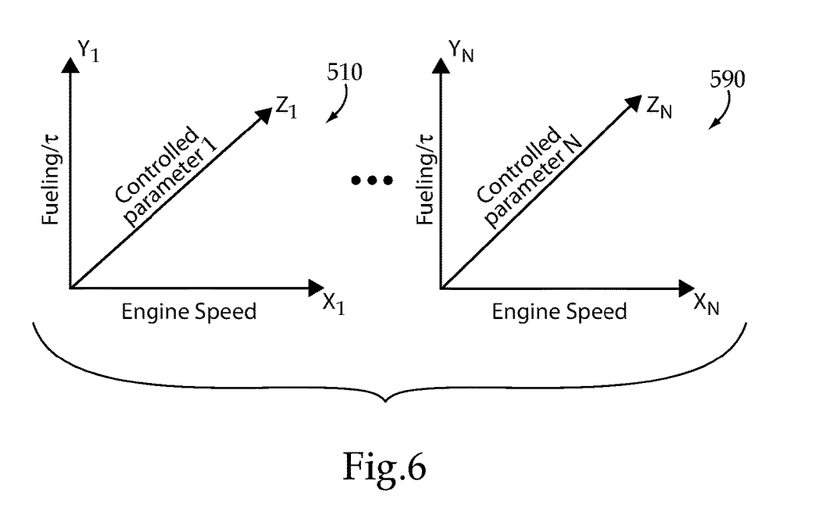
FIG. 6 illustrates example response surfaces.

With reference to FIG. 6 there are illustrated exemplary three-dimensional tables 510 and 590 which can be used to determine a one or more controller parameters for engine operation for various input engine speeds and engine fueling or engine torque values. It shall be appreciated that a plurality of different controlled parameters may be determined using such tables including those disclosed herein.

Figure 7:
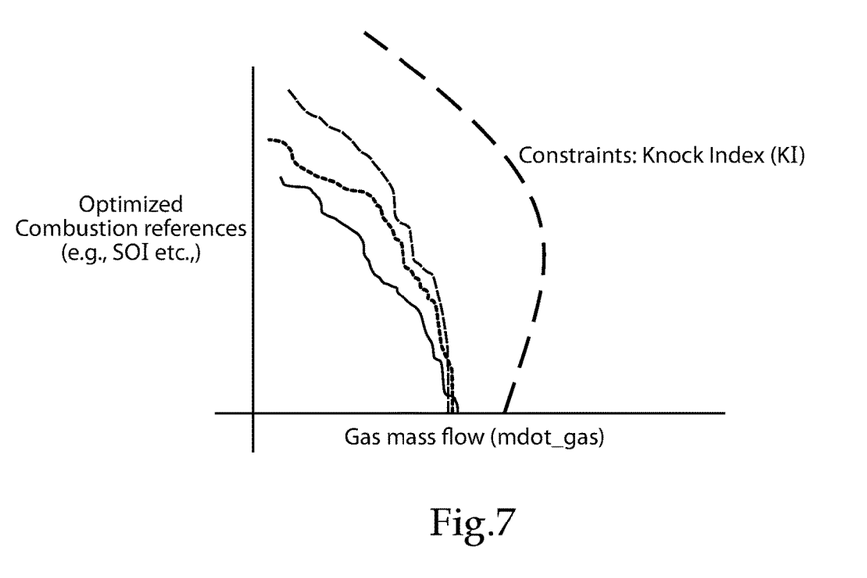
FIG. 7 illustrates a graph depicting curves of optimized combustion references on the vertical axis versus gas mass flow on the horizontal axis and a knock index constraint.

With reference to FIG. 7 there is illustrated illustrates a graph depicting curves of optimized combustion references on the vertical axis versus gas mass flow on the horizontal axis and a knock index constraint.

Various features and advantages of the present invention are set forth in the following claims. Additionally, changes and modifications to the described embodiments described herein will be apparent to those skilled in the art, and such changes and modifications can be made without departing from the spirit and scope of the present invention and without diminishing its intended advantages. While the present invention has been illustrated and described in detail in the drawings and foregoing description, the same is to be considered illustrative and not restrictive in character, it being understood that only selected embodiments have been shown and described and that all changes, equivalents, and modifications that come within the scope of the inventions described herein or defined by the following claims are desired to be protected.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. A system comprising:
an engine structured to selectably combust a combination of liquid fuel injected into a cylinder of the engine and gaseous fuel provided to the cylinder; and
a controller configured to control operation of the engine at a plurality of substitution ratios of gaseous fuel for liquid fuel by interpolating between a first operating table and a second operating table utilizing a combustion index, the combustion index, the first operating table and the second operating table being stored in a non-transitory controller-readable medium,
the first operating table defining first parameters for controlling injection of liquid fuel at a first ratio of substitution of gaseous fuel for liquid fuel,
the second operating table defining second parameters for controlling injection of liquid fuel at a second ratio of substitution of gaseous fuel for liquid fuel, the second ratio being greater than the first ratio,
the combustion index being empirically determined to provide interpolated liquid fuel injection parameters for a plurality of ratios of liquid fuel and gaseous fuel intermediate the first ratio and the second ratio satisfying an engine knock criterion and an engine emission criterion index.

2. The system of claim 1 wherein the first ratio comprises a minimum gaseous fuel substitution ratio.

3. The system of claim 2 wherein the first ratio comprises 100% liquid fuel.

4. The system of claim 1 wherein the second ratio a maximum gaseous fuel substitution ratio.

5. The system of claim 4 wherein the second ratio comprises at least 90% gaseous fuel.

6. The system of claim 1 wherein the liquid fuel comprises diesel fuel and the gaseous fuel comprises at least one of methane and propane.

7. The system of claim 1, wherein the engine emissions criterion comprises a maximum value for hydrocarbon slip.

8. The system of claim 1, wherein the engine knock criterion comprises a maximum value for occurrences of engine knock.

9. The system of claim 1, wherein the combustion index is determined based on one or more inputs which are distinct from charge lambda.

10. The system of claim 1, wherein the combustion index comprises a plurality of dimensionless values.

11. The system of claim 1 wherein the first operating table and the second operating table specify a pre-injection timing, a pre-injection quantity, a main injection timing, a main injection quantity, a post injection timing, a post injection quantity, and an injection pressure.

12. A method comprising:
operating an engine in a first mode in which the engine is fueled with only liquid fuel injected into one or more engine cylinders and the injection of liquid fuel is controlled based upon a first operating map;
calculating a combustion index value based upon one or more sensed engine operating parameters and a predetermined formula or a predetermined lookup table;
operating the engine in a second mode in which the engine is fueled with a first ratio of substitution of gaseous fuel introduced into an intake system upstream of the one or more engine cylinders for liquid fuel injected into one or more engine cylinders and gaseous fuel introduced into an intake system upstream of the one or more engine cylinders and in which the injection of liquid fuel is controlled based upon a first interpolation between the first operating map and a second operating map, the interpolation being based upon the combustion index value;
wherein the predetermined formula or the predetermined lookup table is empirically determined to provide combustion under the one or more sensed operating conditions satisfying an engine knock criterion and an exhaust hydrocarbon criterion for a plurality of ratios of liquid fuel and gaseous fuel substitution of gaseous fuel for liquid fuel.

13. The method of claim 12 further comprising;
calculating a second combustion index value based upon one or more second sensed engine operating parameters and the predetermined formula or the predetermined lookup table;
operating the engine in a third mode in which the engine is fueled with a second ratio of substitution of gaseous fuel introduced into an intake system upstream of the one or more engine cylinders for liquid fuel injected into one or more engine cylinders and gaseous fuel introduced into an intake system upstream of the one or more engine cylinders, the second ratio being greater than the first ratio, and in which the injection is controlled based upon a second interpolation between the first operating map and the second operating map, the second interpolation being based upon the second combustion index value.

14. The method of claim 12 further comprising operating the engine in a third mode in which the engine is fueled with a second ratio of substitution of gaseous fuel introduced into an intake system upstream of the one or more engine cylinders for liquid fuel injected into one or more engine cylinders and gaseous fuel introduced into an intake system upstream of the one or more engine cylinders and in which the injection is controlled based upon the second operating map.

15. The method of claim 12 wherein the first operating map comprises a set of liquid-fuel-only injection parameters including timings and quantities for pre injection, main injection and post injection.

16. The method of claim 15 wherein the second operating map comprises a second set of injection parameters including timings and quantities for pre injection, main injection and post injection, the second set of injection parameters differing from the set of liquid-fuel-only parameters.

17. The method of claim 16 wherein the second set of injection parameters correspond to a maximum ratio of gaseous fuel to liquid fuel.

18. The method of claim 17 wherein the second set of injection parameters correspond to a ratio of gaseous fuel to liquid fuel of at least 90% gaseous fuel.

19. The method of claim 12 wherein the act of calculating the combustion index value is repeated a plurality of times while the engine is operating.

20. An apparatus comprising:
a non-transitory controller readable medium configured to store controller executable instructions configured to generate control commands effective to
operate an engine in a first mode in which fueling of the engine consists essentially of liquid fuel injected into one or more engine cylinders and the injection of liquid fuel is controlled based upon a first operating map;
determine a dimensionless combustion index value based upon one or more sensed engine operating parameters and a predetermined lookup table or a predetermined calculation;
operate the engine in a second mode in which the engine is fueled with a first ratio of substitution of gaseous fuel introduced into an intake system upstream of the one or more engine cylinders for liquid fuel injected into one or more engine cylinders and gaseous fuel introduced into an intake system upstream of the one or more engine cylinders and in which the injection of liquid fuel is controlled based upon a first interpolation between the first operating map and a second operating map, the interpolation being based upon the dimensionless combustion index value;
wherein the instructions are configured to generate control commands to operate the engine at a plurality of ratios of substitution of gaseous fuel for liquid fuel.

21. The apparatus of claim 20 wherein the determined dimensionless combustion index value is one of a plurality of values empirically determined to provide combustion satisfying an engine knock limit and an exhaust hydrocarbon limit for a plurality of ratios of substitution of gaseous fuel for liquid fuel and gaseous fuel and a plurality of values of the one or more sensed operating conditions.

22. The apparatus of claim 21 wherein the first operating map comprises a set of liquid-fuel-only injection parameters including timings and quantities for pre injection, main injection and post injection.

23. The apparatus of claim 22 wherein the second operating map comprises a second set of injection parameters including timings and quantities for pre injection, main injection and post injection, the second set of injection parameters differing from the set of liquid-fuel-only parameters.

24. The apparatus of claim 23 wherein the second set of injection parameters correspond to a maximum ratio of gaseous fuel to liquid fuel.

25. The method of claim 24 wherein the second set of injection parameters correspond to a ratio of gaseous fuel to liquid fuel of at least 90% gaseous fuel.

* * * * *